US007766423B2

(12) United States Patent
Alexander et al.

(10) Patent No.: US 7,766,423 B2
(45) Date of Patent: Aug. 3, 2010

(54) ACTIVE MATERIAL HEAD RESTRAINT ASSEMBLY

(75) Inventors: Paul W. Alexander, Ypsilanti, MI (US); James H. Brown, Costa Mesa, CA (US); Aragorn Zolno, Whittier, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 209 days.

(21) Appl. No.: 12/056,659

(22) Filed: Mar. 27, 2008

(65) Prior Publication Data

US 2008/0252112 A1 Oct. 16, 2008

Related U.S. Application Data

(60) Provisional application No. 60/911,314, filed on Apr. 12, 2007.

(51) Int. Cl.
*B60N 2/48* (2006.01)
*B60N 2/42* (2006.01)

(52) U.S. Cl. ................................ 297/216.12; 297/391

(58) Field of Classification Search ............ 297/216.12, 297/216.13, 216.14, 391
See application file for complete search history.

(56) References Cited

U.S. PATENT DOCUMENTS

| | | | | |
|---|---|---|---|---|
| 6,082,817 | A * | 7/2000 | Muller | 297/216.12 |
| 6,213,548 | B1 | 4/2001 | Van Wynsberghe et al. | |
| 7,070,235 | B2 | 7/2006 | Schilling et al. | |
| 7,293,829 | B2 | 11/2007 | Thiel et al. | |
| 7,344,191 | B2 * | 3/2008 | Schilling et al. | 297/216.12 |
| 7,350,859 | B2 * | 4/2008 | Klukowski | 297/216.12 |
| 7,448,677 | B2 | 11/2008 | Sakai et al. | |
| 7,448,678 | B2 * | 11/2008 | Browne et al. | 297/216.12 |
| 7,556,313 | B2 * | 7/2009 | Browne et al. | 297/216.12 |
| 7,581,792 | B2 * | 9/2009 | Saberan | 297/452.18 |
| 7,594,697 | B2 * | 9/2009 | Browne et al. | 297/216.12 |
| 7,611,196 | B2 * | 11/2009 | Terada et al. | 297/216.12 |
| 7,618,091 | B2 * | 11/2009 | Akaike et al. | 297/216.12 |
| 2006/0226688 | A1 * | 10/2006 | Terada et al. | 297/391 |
| 2007/0085400 | A1 * | 4/2007 | Terada et al. | 297/391 |
| 2009/0062989 | A1 | 3/2009 | Sakai et al. | |

FOREIGN PATENT DOCUMENTS

| | | | |
|---|---|---|---|
| DE | 4419350 | A1 | 12/1995 |
| DE | 19951966 | A1 | 10/1999 |
| EP | 1645460 | A1 | 4/2006 |
| WO | 2007056640 | A2 | 5/2007 |

* cited by examiner

*Primary Examiner*—Sarah B McPartlin
(74) *Attorney, Agent, or Firm*—Quinn Law Group, PLLC

(57) ABSTRACT

A head restraint assembly is provided that is movable between a retracted position and a deployed position. The head restraint assembly includes a support member and a deployable member. A link is rotatably mounted with respect to the support member and the deployable member. A shaft is mounted to the link for rotation therewith. The active material is actuatable to rotate the shaft and thereby cause the deployable member to move from its retracted position to its deployed position.

15 Claims, 6 Drawing Sheets

110
120
130
132
134
F

ACTIVE MATERIAL HEAD RESTRAINT ASSEMBLY

CROSS REFERENCE TO RELATED APPLICATION

This application claims the benefit of U.S. Provisional Patent Application No. 60/911,314, filed Apr. 12, 2007, and which is hereby incorporated by reference in its entirety.

TECHNICAL FIELD

The invention relates to a head restraint in automotive vehicles, and more particularly to latching and deployment of the head restraint using an active material.

BACKGROUND OF THE INVENTION

Head restraint assemblies are commonly employed in vehicles and are typically adjustably attached to the seatback. The head restraint is in alignment with the back of a seated occupant's head to provide comfort, support, and protection during operation of the vehicle. The padded portion of the head restraint that is adapted to provide the support and protection is typically positioned by the end-user.

Occupants of a vehicle tend to position their seat backs at different angles for comfort. For example, vehicle occupants tend to sit more upright in vehicles with higher seating heights such as vans and sport utility vehicles whereas in passenger cars the occupants tend to be in a more reclined position. The changes in seat back position can move the attached head restraint further or closer to the head of the seated occupant. That is, the space between an occupant's head and the head restraint can be affected and altered by the seat back position.

SUMMARY OF THE INVENTION

In some situations it may be desirable for the head restraint to be close to or touching the back of the occupant's head. During vehicle use it may be desirable to adjust the head restraint assembly from a position selected based upon comfort to a position that is based upon support for the occupant.

A head restraint assembly is provided which includes a support member and a deployable member selectively movable between a retracted position and a deployed position. The deployable member is farther from the support member in the deployed position than in the retracted position. A link is rotatably mounted with respect to the support member and rotatably mounted with respect to the deployable member. The head restraint assembly further includes a shaft that is mounted to the link for rotation therewith. An active material member has first and second ends mounted with respect to the support member. A center portion of the active material member engages a lip on the shaft such that the active material member is characterized by a curved shape, with the ends opposite sides of the lip. The active material is actuatable to rotate the shaft and thereby cause the deployable member to move from its retracted position to its deployed position.

An alternative head restraint assembly uses a clutch assembly slidingly engaged with a rod for translation. A second link is rotatably mounted with respect to the deployable member and the clutch assembly. Movement of the deployable member from its retracted position to its deployed position causes the second link to rotate such that the clutch assembly translates along the rod. The second link and rod create a frame support for the member, giving it a more stable configuration and higher load capacity when an object makes contact with the padded member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
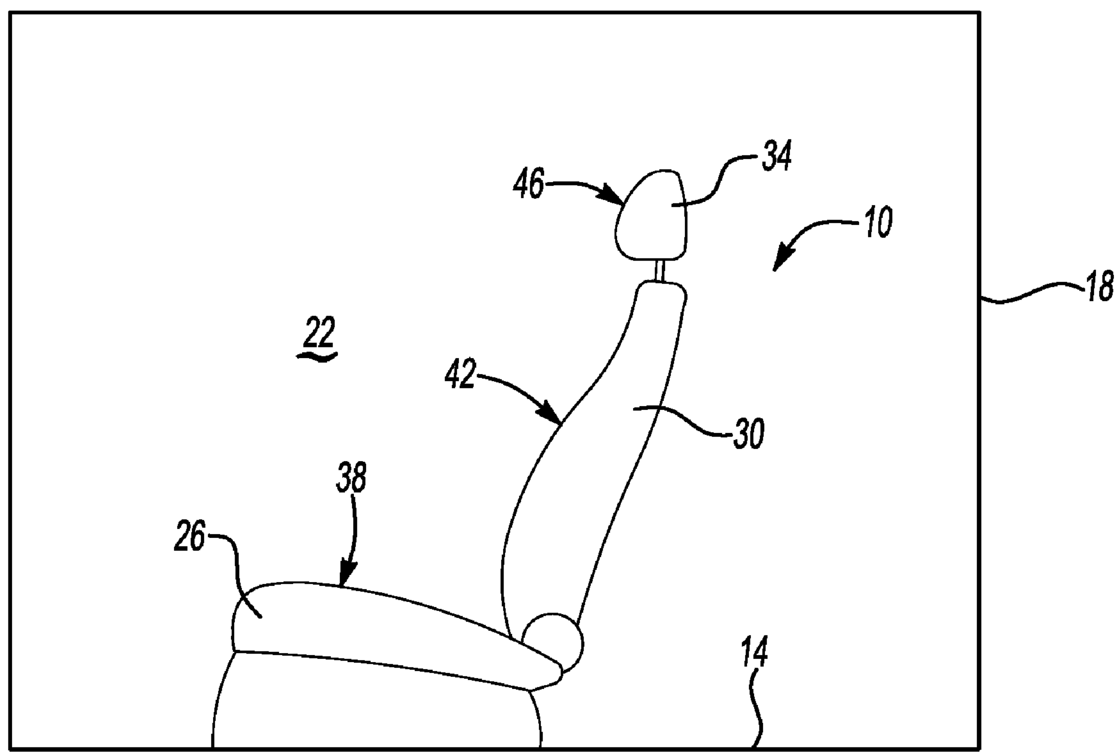
FIG. 1 is a schematic illustration of a passenger compartment having a seat assembly with a head restraint assembly.

Referring to the drawings, wherein like reference numbers refer to like components, FIG. 1 schematically depicts, a seat assembly 10 mounted to the floor 14 of a vehicle body 18. The vehicle body 18 defines a passenger compartment 22 in which the seat assembly 10 is disposed. The seat assembly 10 includes a lower seat portion 26, a seatback portion 30, and a head restraint assembly 34. The lower seat portion 26 defines a generally horizontally-oriented surface 38 for supporting an occupant (not shown). The seatback portion 30 is mounted with respect to the lower seat portion 26, and defines surface 42 for supporting the back of the occupant. The seatback portion 30 may be rigidly mounted with respect to the lower seat portion 26, or may be rotatably mounted with respect to the lower seat portion 26 so that the reclination angle is selectively variable by the occupant.

The head restraint assembly 34 is mounted to the upper end of the seatback portion 30. The head restraint assembly 34 is depicted as a separate member from the seatback portion; however, it should be noted that, within the scope of the claimed invention, a head restraint assembly may be an integral part of a seatback portion as understood by those skilled in the art. For example, a head restraint may be the upper portion of a seatback. The head restraint assembly 34 defines a surface 46 that faces generally the same direction as surface 42.

Figure 2:
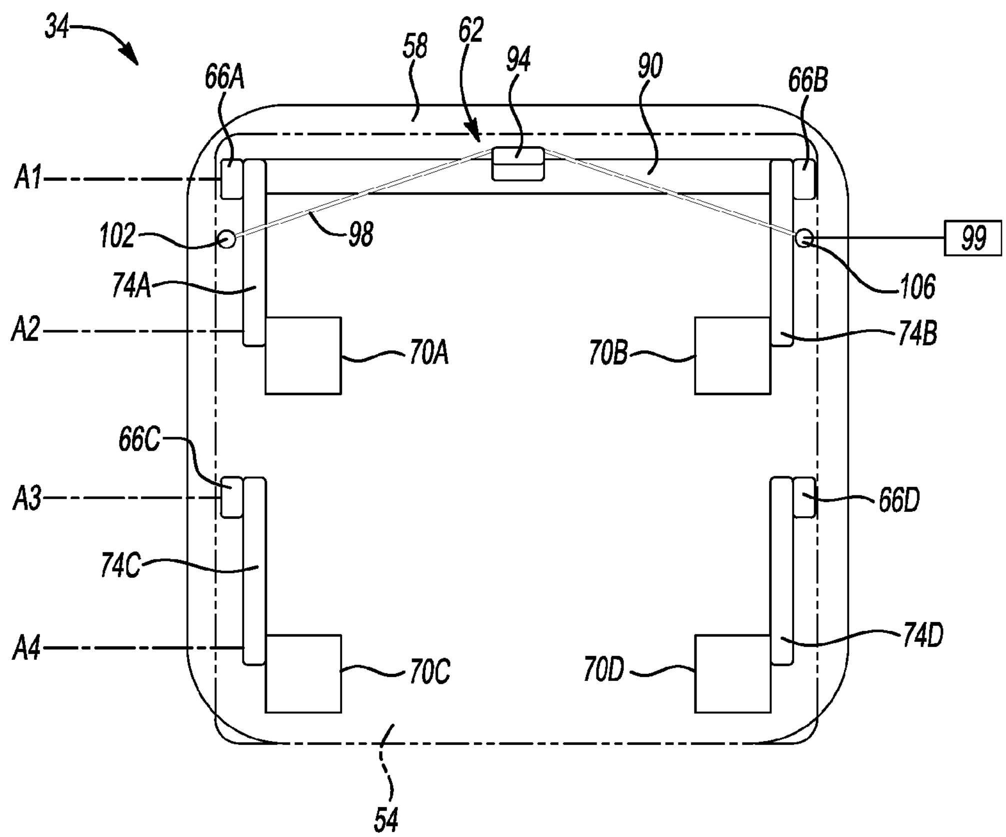
FIG. 2 is a rear schematic view of the head restraint assembly of FIG. 1 in a restrained position.
Figure 2A:
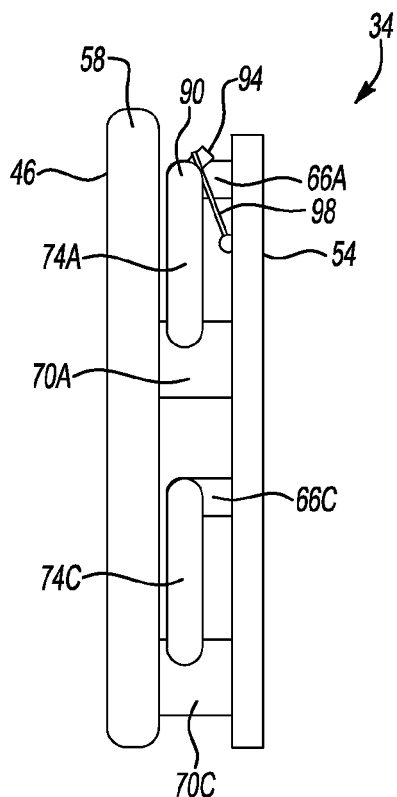
FIG. 2A is a side schematic view of the head restraint assembly of FIGS. 1 and 2 in the restrained position.

Referring to FIGS. 2 and 2A, head restraint assembly 34 includes a support member, such as plate 54, that is mounted with respect to the seatback portion (shown at 30 in FIG. 1), and a padded member 58 that defines surface 46. The padded member 58 is operatively connected to the plate 54 by an actuator assembly 62 that is configured to selectively move the padded member 58 with respect to the plate 54. The actuator assembly 62 includes four brackets 66A-D mounted to the plate 54, and four brackets 70A-D mounted to the padded member 58. Four links 74A-D operatively interconnect the plate 54 and the padded member 58. It should be noted that padded member 58 is exemplary; member 58 selectively moves the surface 46 (shown in FIG. 1) of the head restraint assembly 34 and may have other configurations within the scope of the claimed invention. Surface 46 may be formed by an elastic membrane operatively connected to a member 58, etc.

More specifically, link 74A is rotatably connected to the bracket 66A at one end for rotation with respect to the plate 54 about axis A1, and link 74A is rotatably connected to the bracket 70A at the other end for rotation with respect to the padded member 58 about axis A2; link 74B is rotatably connected to the bracket 66B at one end for rotation with respect to the plate 54 about axis A1, and link 74B is rotatably connected to the bracket 70B at the other end for rotation with respect to the padded member 58 about axis A2; link 74C is rotatably connected to the bracket 66C at one end for rotation with respect to the plate 54 about axis A3, and is rotatably connected to the bracket 70C at the other end for rotation with respect to the padded member 58 about axis A4; and link 74D is rotatably connected to the bracket 66D at one end for rotation with respect to the plate 54 about axis A3, and is rotatably connected to the bracket 70D at the other end for rotation with respect to the padded member 58 about axis A4. Axes A1, A2, A3, A4 are parallel.

The padded member 58 is depicted in a first position, i.e. retracted position, with respect to the plate 54 in FIGS. 2 and 2A. When the padded member 58 is in the first position, links 74A-C are generally vertically oriented such that the brackets 70A-D abut the plate 58.

The actuator assembly 62 further includes a shaft 90 that is mounted to the links 74A, 74B for rotation therewith about axis A1. Shaft 90 is generally cylindrical and is characterized by a lip 94 that protrudes radially therefrom. The actuator assembly 62 also includes a shape memory alloy (SMA) wire 98 characterized by a first end 102 and a second end 106. The first and second ends 102, 106 are mounted to the plate 54 at opposite sides thereofThe central portion of the SMA wire 98 contacts the lip 94. The lip 94 is higher than the mounting locations of ends 102, 106 so that the SMA wire 98 is characterized by a "bowstring" shape, as shown in the Figures.

A shape memory alloy is characterized by a cold state, i.e., when the temperature of the alloy is below its martensite finish temperature $M_f$. A shape memory alloy is also characterized by a hot state, i.e., when the temperature of the alloy is above its austenite finish temperature $A_f$. An object formed of the alloy may be characterized by a predetermined shape. When the object is pseudo-plastically deformed in the cold state, the strain may be reversed by heating the object above its austenite finish temperature $A_f$, i.e., heating the object above its $A_f$ will cause the object to return to its predetermined shape as the material changes phase from Martensite to Austenite. An SMA's modulus of elasticity and yield strength are also significantly lower in the cold state than in the hot state. As understood by those skilled in the art, pseudo-plastic strain is similar to plastic strain in that the strain persists despite removal of the stress that caused the strain. However, unlike plastic strain, pseudo-plastic strain is reversible when the object is heated to its hot state.

Figure 3:
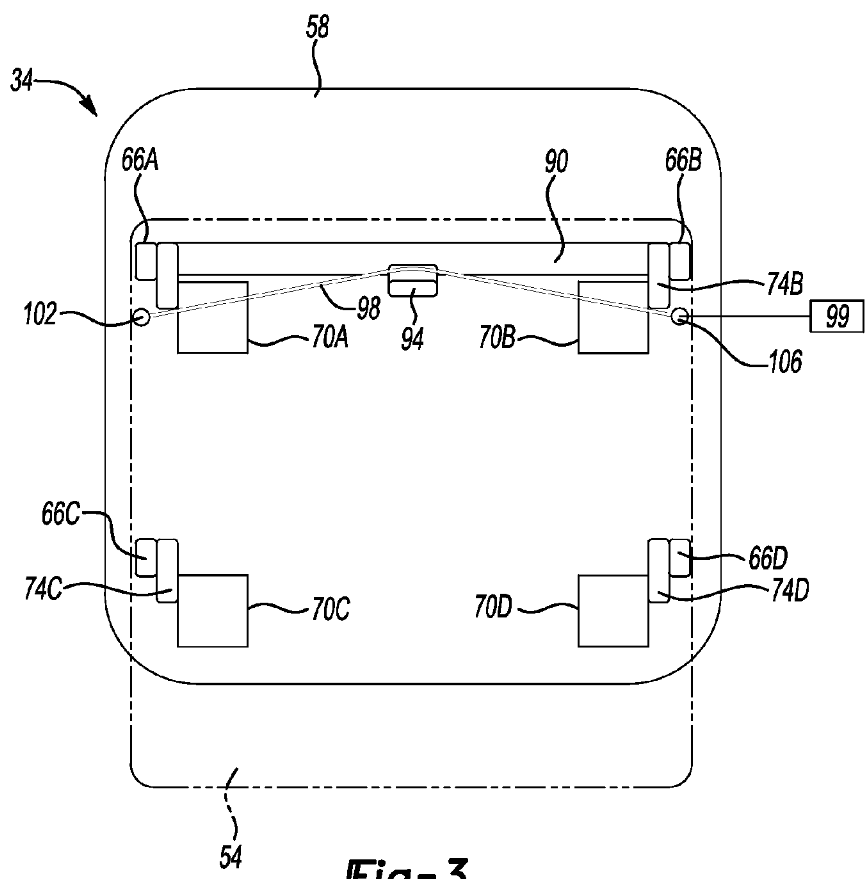
FIG. 3 is a rear schematic view of the head restraint assembly of FIGS. 1-2A in a deployed position.
Figure 3A:
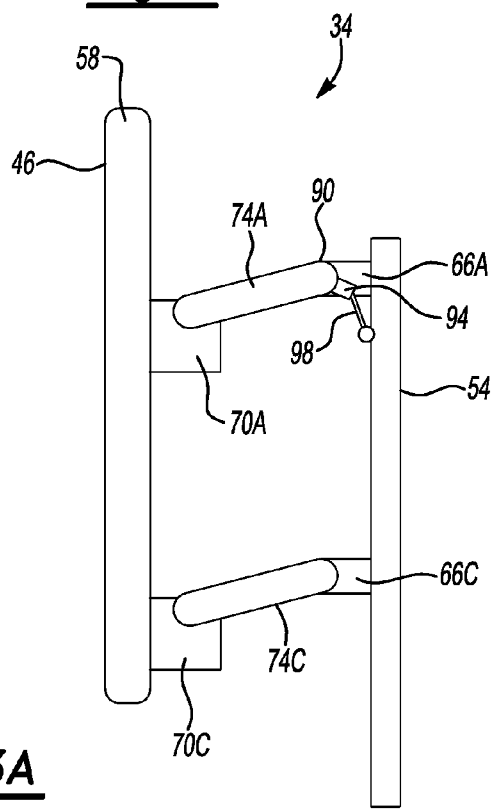
FIG. 3A is a side schematic view of the head restraint assembly of FIGS. 1-3 in the deployed position.

The SMA wire 98 is characterized by a predetermined length (shape), and is configured such that it is characterized by tensile strain when the padded member 58 is in its first position, as shown in FIGS. 2 and 2A. An activation device 99 is connected to the wire 98 to apply an activation signal to the wire 98. When the wire 98 is heated to its hot state, it decreases in length, exerting sufficient force on the lip 94 to cause rotation of the shaft 90, and, therefore, links 74A, 74B, about axis A1, as shown in FIGS. 3 and 3A. Referring to FIGS. 3 and 3A, as the links 74A, 74B rotate about axis A1, they cause the padded member 58 to move away from the plate 54. The movement of the padded member 58 as a result of the rotation of links 74A, 74B in turn causes the rotation of links 74C, 74D. When the SMA wire 98 is its predetermined length, the padded member 58 is in a second position, i.e. deployed position, with respect to the plate 54, as shown in FIGS. 3 and 3A, in which the padded member 58 is extended forward in the vehicle body and closer to an occupant than in the first position.

The bowstring arrangement of the SMA wire 98 results in less SMA wire used compared to other SMA wire arrangements, and results in faster deployment of the padded member 58 from its first position to its second position. With the bowstring arrangement, the ends of the SMA wire are fixed, and so lead wires that supply current to the SMA wire need only move enough to accommodate movement of the ends 102, 106 that may result from an object obstructing movement of the member 58 during deployment (i.e., if the ends are mounted to the plate 54 via an energy absorber such as a spring). There may also be conditions where the SMA wires are not capable of deploying the head restraint assembly with enough force/speed. In such cases low stiffness balance springs can be attached to the mechanism in a number of positions so that they counteract the mass of padded member 58 as well as the mass of other mechanism/head restraint components that are moved during deployment. These balance springs may take the form of extension springs connected between linkage arms (such as between links 74A and 74C), extension springs connecting the support to the front surface (such as between 54 and 70C), extension springs connecting support to linkage arms (such as between 54 and 74C), or torsion springs located at one of the linkage of support/clutch pivot points (such as between member 66A and link 74A).

Figure 4:
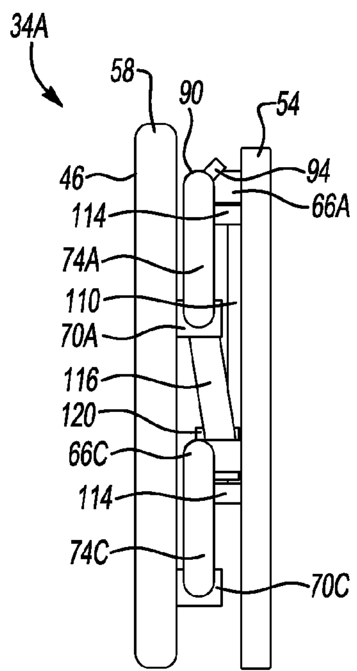
FIG. 4 is a side schematic view of another embodiment of a head restraint assembly for use with the seat assembly of FIG. 1 in a restrained position.
Figure 6:
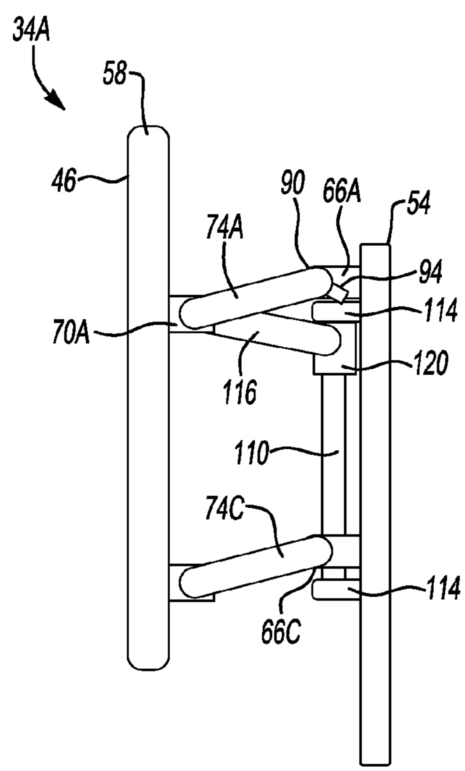
FIG. 6 is a side schematic view of the head restraint assembly of FIGS. 4 and 5 in a fully deployed position.

Referring to FIG. 4, an alternative head restraint assembly 34A is schematically depicted. The head restraint assembly 34A uses a four-bar parallel linkage system (mirrored on each side of the head restraint) to move member 58 from a first position relative to plate 54 (i.e., a retracted position as shown in FIG. 4) to a second position relative to the plate 54 (i.e., a deployed position as shown in FIG. 6).

Brackets 66A, 66C are mounted to the plate 54, and brackets 70A, 70C are mounted to the padded member 58. Link 74A is rotatably connected to the bracket 66A at one end for rotation with respect to the plate 54, and link 74A is rotatably connected to the bracket 70A at the other end for rotation with respect to the padded member 58; link 74C is rotatably connected to the bracket 66C at one end for rotation with respect to the plate 54, and link 74C is rotatably connected to the bracket 70C at the other end for rotation with respect to the padded member 58.

Figure 5:
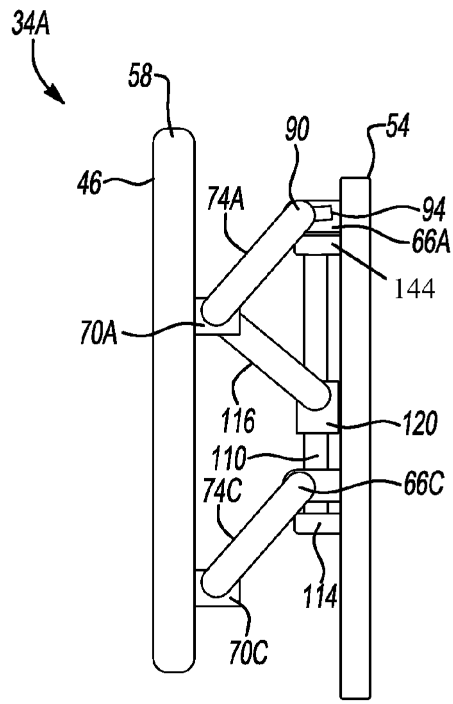
FIG. 5 is a side schematic view of the head restraint assembly of FIG. 4 in a partially deployed position.

A rod 110 is mounted to plate 54 via brackets 114. A link 116 is rotatably connected to bracket 70A at one end and is rotatably connected to a clutch assembly 120 at the other end. Clutch assembly 120 is slidingly engaged with the rod 110 such that movement of the clutch assembly 120 is substantially limited to translation along the rod 110. Shaft 90 is mounted to link 74A for rotation therewith. Shaft 90 includes lip 94. An SMA wire (not shown in FIGS. 4-6) operatively interconnects the lip 94 and the plate 54 in an identical manner to that shown in FIGS. 2-3A. When the SMA wire is heated to its hot state, it causes rotation of the shaft 90, which in turn causes rotation of link 74A, and movement of the member 58 away from the plate 54. The member 58 is shown in an intermediate position with respect to the plate 54 in FIG. 5, and is shown in its second position with respect to the plate 54 in FIG. 6. Referring to FIGS. 5 and 6, the movement of the member 58 causes the link 116 to translate the clutch assembly upward along the rod 110, so that link 116 and link 74A create an A-frame support for the member 58, giving it a more stable configuration and higher load capacity when an object makes contact with the outer surface 46.

The clutch assembly 120 is a one-way clutch that permits movement of the clutch assembly 120 upward along the rod 110 and prevents downward movement of the clutch assembly 120 downward along the rod 110. Accordingly, the clutch assembly 120 prevents movement of the member 58 from its second position, as shown in FIG. 6, to its first position, as shown in FIG. 4.

Figures 7, 8, 9, 10, 11:
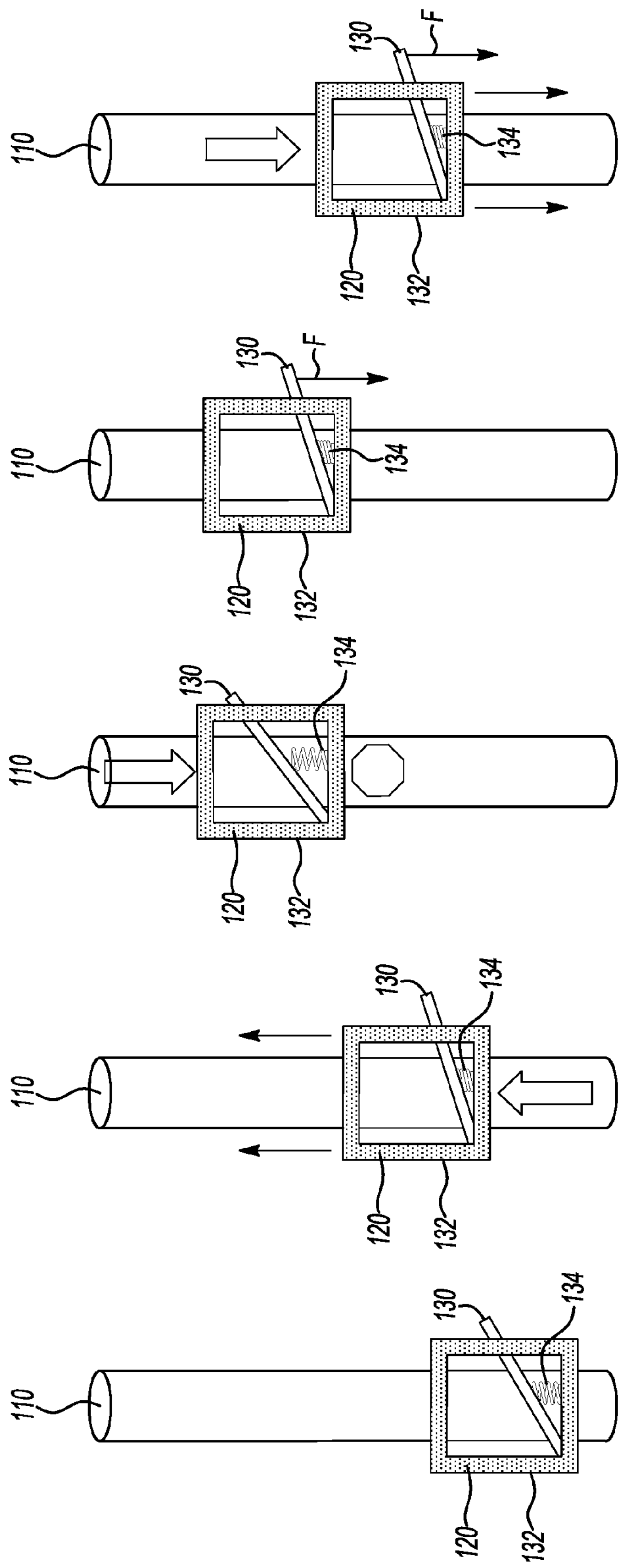
FIG. 7 is a schematic illustration of a clutch assembly used in the head restraint assembly of FIGS. 4-6 in a nominal position.
FIG. 8 is a schematic illustration of the clutch assembly of FIG. 7 in an upwardly driven second position.
FIG. 9 is a schematic illustration of the clutch assembly of FIGS. 7 and 8 in a locked third position.
FIG. 10 is a schematic illustration of the clutch assembly of FIGS. 7-9 in a disengaged fourth position.
FIG. 11 is a schematic illustration of the clutch assembly of FIGS. 7-10 in a downwardly driven fifth position.

Referring to FIGS. 7-11, the clutch assembly 120 includes a plate 130 with a hole (not shown) formed therein. The plate 130 is pivotably connected to member 132. The rod 110 extends through a hole in the plate 130, which is mounted at an angle preserved by a spring 134. The hole in the tilted plate 130 allows for the assembly 120 to slide freely up the rod 110, as shown in FIG. 8. When the assembly 120 is loaded in the downward direction, as shown in FIG. 9, spring 34, coupled with friction on the rod 110, helps to further lift and rotate the plate 130 so that it positively locks on to the rod 110, restricting any downward motion of the plate 130 and the assembly 120. The clutch assembly 120 can be returned to its original position by rotating the plate 130, such as by applying force F thereto (as shown in FIG. 10) to allow the plate 130 and the assembly 120 to slide back down the rod 110, as shown in FIG. 11.

Figure 12:
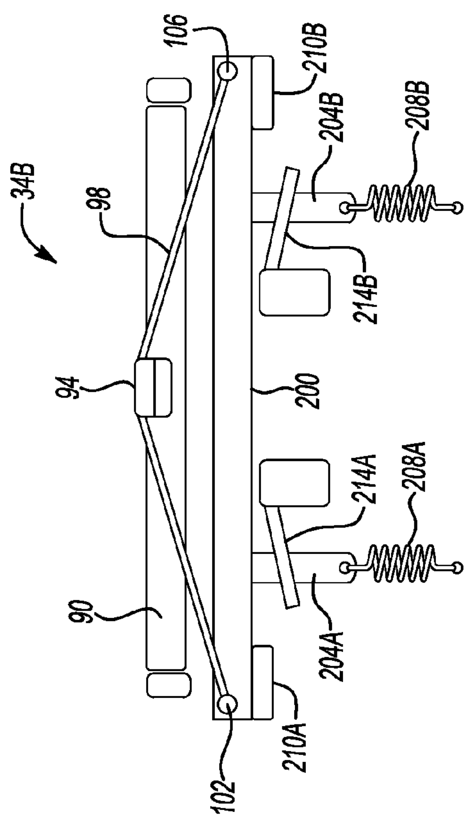
FIG. 12 is a rear schematic view of another embodiment of a head restraint assembly for use with the seat assembly of FIG. 1 in a restrained and latched position.

Referring to FIG. 12, wherein like reference numbers refer to like components from FIGS. 1-11, an alternative head restraint actuation assembly 34B is schematically depicted. SMA wire 98 is mounted to a bar 200 at its ends 102, 106, and is engaged with the lip 94 of shaft 90 in the "bowstring" arrangement. Pins 204A, 204B are mounted to the bar 200, and each pin 204A, 204B is connected to a respective spring 208A, 208B that pulls the bar 200 against stop members 210A, 210B. The springs 208A, 208B are mounted at the opposing ends to plate 54 of FIG. 1. Each pin 204A, 204B slides through a respective hole (not shown) formed in a respective member 214A, 214B. Members 214A, 214B are angled with respect to the pins 204A, 204B such that upward movement of the bar 200 is permitted, but downward movement of the bar 200 is prevented. The interaction between members 214A, 214B and the pins 204A, 204B is similar to the interaction between the plate 130 and rod 110.

Figure 13:
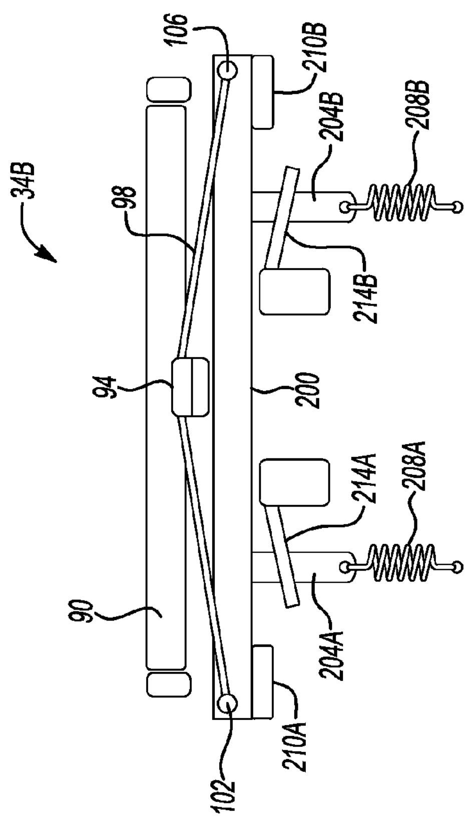
FIG. 13 is a rear schematic view of the head restraint assembly of FIG. 12 in a restrained and unlatched position.
Figure 15:
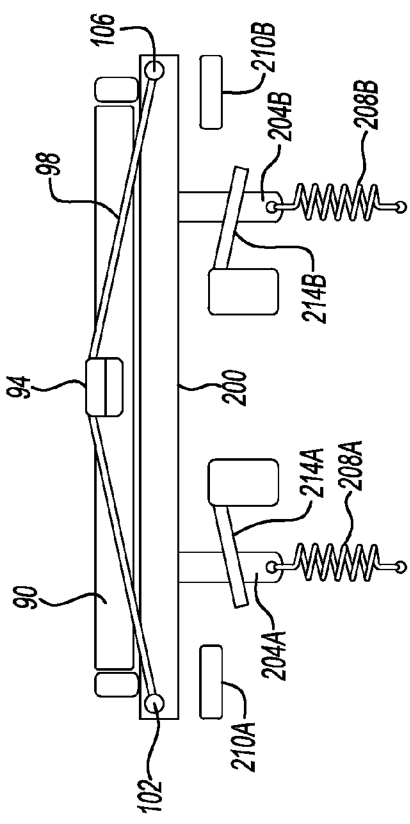
FIG. 15 is a rear schematic view of the head restraint assembly of FIGS. 12-14 in a deployed position.
Figure 14:
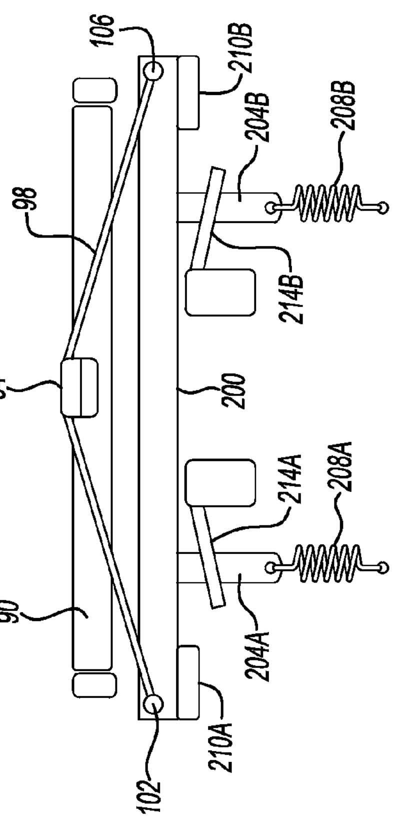
FIG. 14 is a rear schematic view of the head restraint assembly of FIGS. 12 and 13 in a restrained and unlatched position.

When the SMA wire 98 is actuated, i.e., heated to its hot state, it urges the shaft 90 to rotate, as shown in FIG. 13, thereby moving the padded member (shown at 58 in FIG. 2) to move from its first position to its second position. Referring to FIGS. 13 and 14, if an object obstructs the padded member and prevents its movement from the first position to the second position, then the force of the SMA wire 98, when it is heated to its hot state, causes the springs 208A, 208B to elongate so that the bar 200 is moved upward, as shown in FIG. 15. The bar 200 would then be prevented from returning downward unless the members 214A, 214B are shifted. The springs 208A, 208B thus provide strain relief. A strain relief mechanism such as described can be reset to its original configuration if engaged during deployment of the head restraint so that the mechanism can be deployed at a subsequent time. The resetting of the strain relief can be done automatically using a mechanical interaction. For example, members 214A, 214B can be forced to their "disengaged" position (similar to FIG. 10), by protruding members rigidly attached to rotating shaft 90. When in the retracted position, these protrusions would keep members 214A, 214B disengaged. As they rotate outward and upward (into the page), the protrusions would no longer restrict the position of members 214A, 214B, allowing the one-way operation of the strain relief device. If the shaft and protrusions are rotated to their original orientation, the protrusions would again contact members 214A, 214B, disengaging them. Once disengaged the stretched springs 208A, 208B would be free to contract, pulling bar 200 back down to its original position against the stops 210A, 210B.

Shape memory alloy wires are employed in the embodiments herein. However, other active materials may be employed within the scope of the claimed invention. For example, other shape memory materials may be employed. Shape memory materials, a class of active materials, also sometimes referred to as smart materials, refer to materials or compositions that have the ability to remember their original shape, which can subsequently be recalled by applying an external stimulus (i.e., an activation signal). Thus, deformation of a shape memory material from its original shape can be a temporary condition.

Exemplary shape memory materials include shape memory alloys (SMAs), electroactive polymers (EAPs) such as dielectric elastomers, ionic polymer metal composites (IPMC), piezoelectric polymers and shape memory polymers (SMPs), magnetic shape memory alloys (MSMA), shape memory ceramics (SMCs), baroplastics, piezoelectric ceramics, magnetorheological (MR) elastomers, composites of the foregoing shape memory materials with non-shape memory materials, and combinations comprising at least one of the foregoing shape memory materials. The EAPs, piezoceramics, baroplastics, and the like can be employed in a similar manner as the shape memory alloys described herein, as will be appreciated by those skilled in the art in view of this disclosure.

In the present disclosure, most embodiments include shape memory wires; however, shape memory materials and other active materials may be employed in a variety of other forms within the scope of the claimed invention, such as strips, sheets, slabs, foam, cellular and lattice structures, helical or tubular springs, braided cables, tubes or combinations comprising at least one of the forgoing forms can be employed in a similar manner as will be appreciated by those skilled in the art in view of this disclosure.

While the best modes for carrying out the invention have been described in detail, those familiar with the art to which this invention relates will recognize various alternative designs and embodiments for practicing the invention within the scope of the appended claims.

The invention claimed is:

1. A head restraint assembly comprising:

a support member;

a deployable member selectively movable between a retracted position and a deployed position; said deployable member being farther from the support member in the deployed position than in the retracted position;

a link rotatably mounted with respect to the support member and rotatably mounted with respect to the deployable member;

a shaft mounted with respect to the link for rotation with the link with respect to the support member, said shaft having a lip; and an active material member that is characterized by first and second ends; wherein the first and second ends are mounted with respect to the support member on opposite sides of the lip, and a center portion of the active material member engages the lip; wherein the first and second ends and the lip are sufficiently positioned with respect to one another such that the active material member is characterized by a curved shape; said active material being actuatable to rotate the shaft and thereby cause the deployable member to move from the retracted position to the deployed position.

2. The head restraint assembly of claim 1, wherein the active material member comprises at least one of a shape memory alloy, a ferromagnetic shape memory alloy, a shape memory polymer, a magnetorheological elastomer, an electrorheological elastomer, an electroactive polymer, and a piezoelectric material.

3. The head restraint assembly of claim 1, wherein the active material member is a wire.

4. The head restraint assembly of claim 1, wherein the active material is configured to be activated by an activation signal that comprises at least one of, a thermal activation signal, an electric activation signal, a magnetic activation signal, a chemical activation signal, and a mechanical load.

5. The head restraint assembly of claim 4, further comprising an activation device configured to provide the activation signal to the active material.

6. The head restraint assembly of claim 1, wherein the active material member changes in at least one of shape, stiffness and a dimension in proportion to an applied external signal.

7. The head restraint assembly of claim 1, further comprising:

a bar moveable relative to the support member, wherein the active material member is mounted to the bar; and at least one spring located between the bar and the support member to bias the bar in a direction toward the support member.

8. The head restraint assembly of claim 7, wherein the bar is moveable in a direction toward the deployable member to reduce strain of the active material member.

9. A head restraint assembly comprising:

a support member;

a deployable member selectively movable between a retracted position and a deployed position; said deployable member being farther from the support member in the deployed position than in the retracted position;

a rod being mounted with respect to the support member;

a clutch assembly slidingly engaged with the rod for translation therealong;

a first link rotatably mounted with respect to the support member and rotatably mounted with respect to the deployable member;

a second link rotatably mounted with respect to the deployable member and rotatably mounted with respect to the clutch assembly; and the head restraint being configured such that movement of the deployable member from the retracted position to the deployed position causes the second link to rotate such that the clutch assembly translates along the rod.

10. The head restraint assembly of claim 9, wherein the deployable member includes an active material member to actuate movement from the retracted position to the deployed position.

11. The head restraint assembly of claim 10, wherein the active material member comprises at least one of a shape memory alloy, a ferromagnetic shape memory alloy, a shape memory polymer, a magnetorheological elastomer, an electrorheological elastomer, an electroactive polymer, and a piezoelectric material.

12. The head restraint assembly of claim 10, wherein the active material member is a wire.

13. The head restraint assembly of claim 10, wherein the active material is configured to be activated by an activation signal that comprises at least one of, a thermal activation signal, an electric activation signal, a magnetic activation signal, a chemical activation signal, and a mechanical load.

14. The head restraint assembly of claim 13, further comprising an activation device configured to provide the activation signal to the active material.

15. The head restraint assembly of claim 10, wherein the active material member changes in at least one of shape, stiffness and a dimension in proportion to an applied external signal.

* * * * *